Patented Feb. 20, 1951

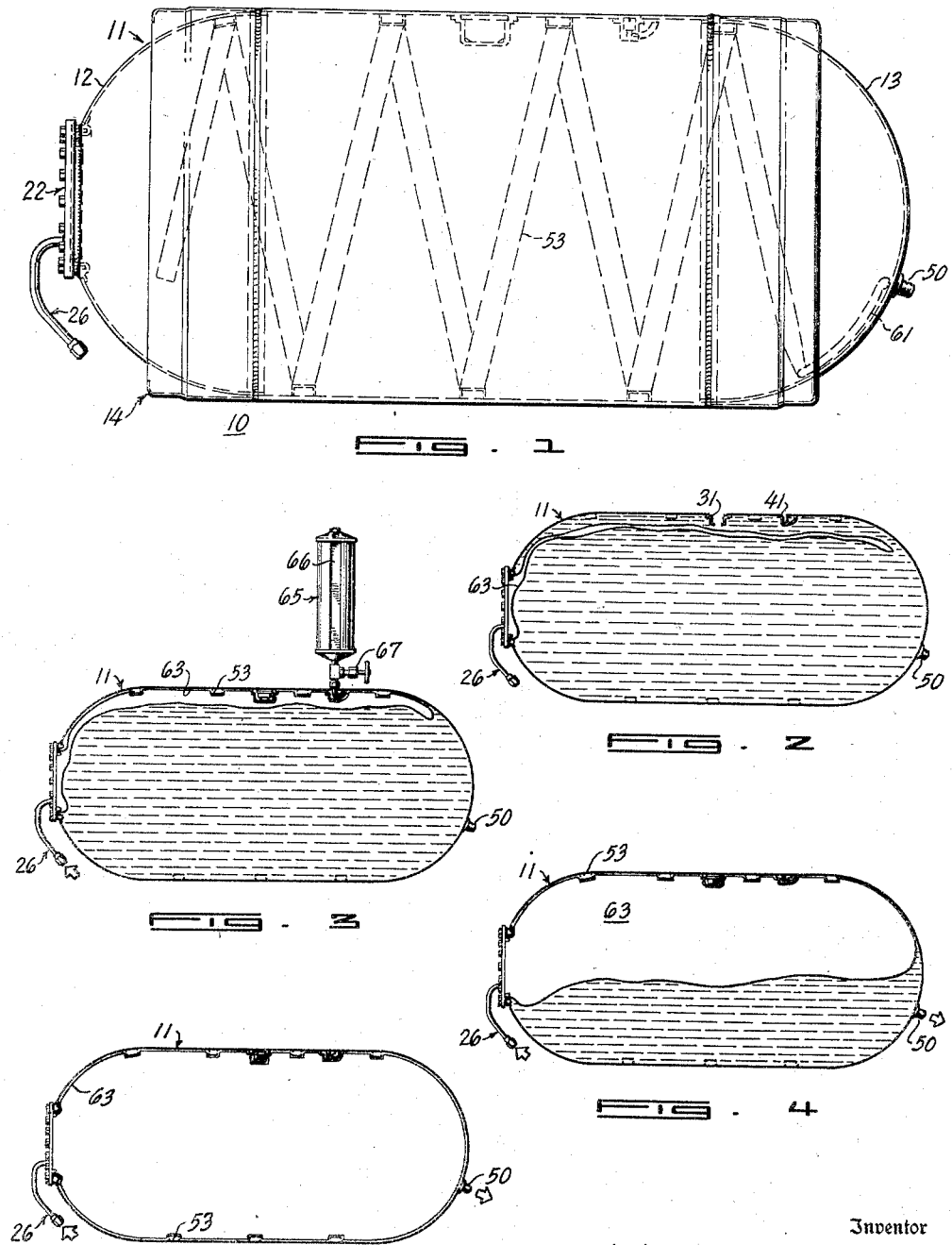

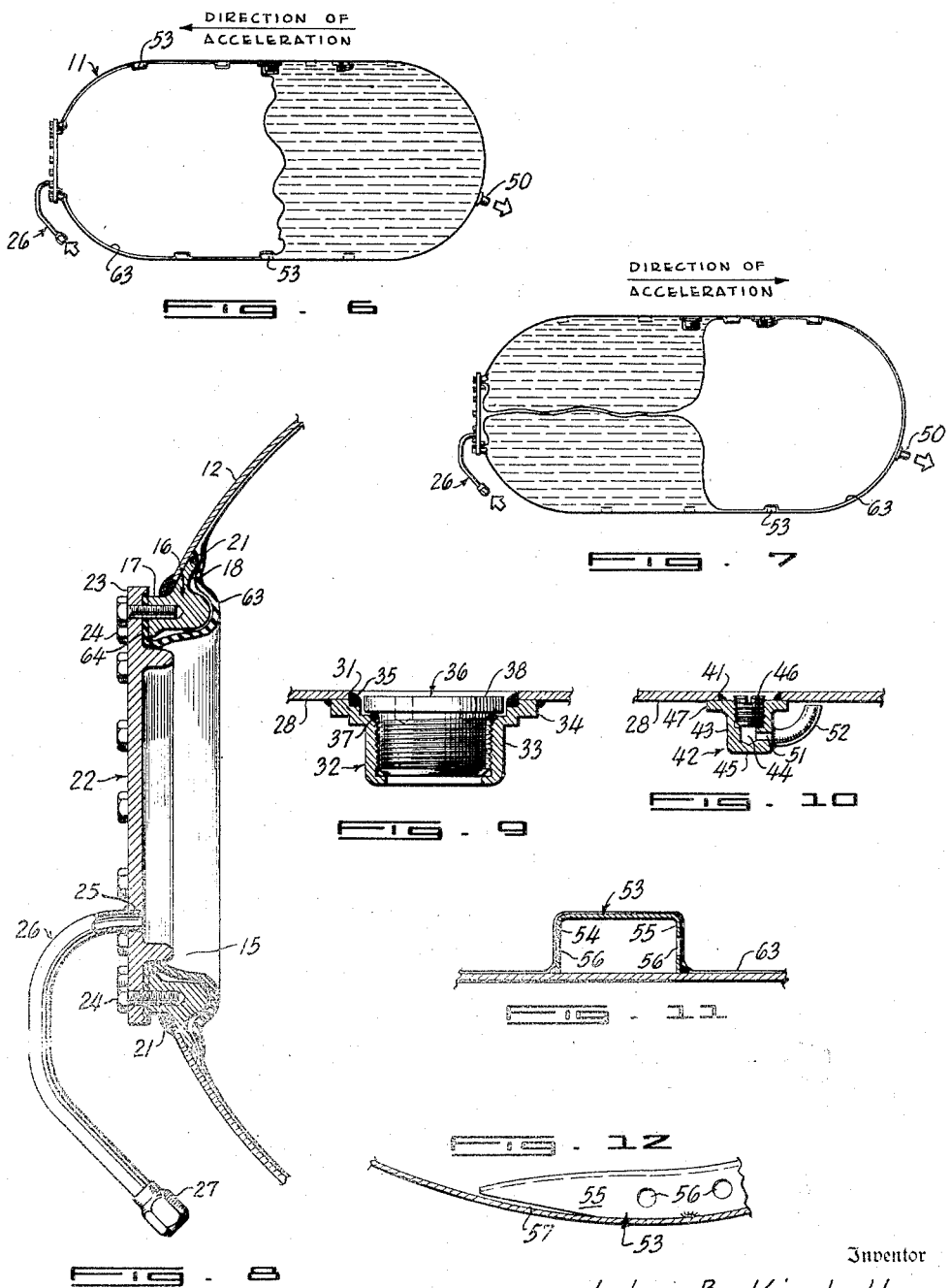

2,542,929

UNITED STATES PATENT OFFICE 2,542,929

TANK WITH FLEXIBLE DIAPHRAGM AND SPIRAL INTERNAL DISCHARGE CHANNEL

John B. Kimball, San Gabriel, Calif., assignor to Consolidated Vultee Aircraft Corporation, San Diego, Calif., a corporation of Delaware Application June 1, 1948, Serial No. 30,244

7 Claims. (Cl. 222—386.5)

This invention relates to fuel tanks and more particularly to means for evacuating fuel from the tank.

One object of the present invention resides in the provision of a fuel tank having an improved construction and a novel arrangement and combination of parts for effecting the ejection of fuel from the tank regardless of the attitude of the tank or the direction of movement and acceleration thereof.

Another object of this invention is to provide an improved form of fuel tank embodying a bag-like member for ejecting fuel therefrom and having a novel interior construction whereby substantially the entire fuel contents of the tank may be efficiently and effectively expelled from the tank.

Another object of this invention is the provision in a fuel tank employing a bag-like member for discharging the contents of the tank of improved means for preventing the trapping of fuel within the tank and providing for the escape of any fuel pockets that might be formed.

A further object of the invention lies in providing a fuel tank having an improved construction whereby fuel may be supplied to the tank and air that may be present in the tank expelled therefrom so that substantially no air remains in the tank to be mixed with the fuel.

A still further object of the invention is to provide a fuel tank structure which is an improvement in the art and which is characterized by simplicity of construction.

Other objects and features of the present invention will be readily apparent to those skilled in the art from the following specification and appended drawings wherein is illustrated a preferred form of the invention, and in which:

Figure 1 is a side elevational view of a fuel tank embodying the present invention;

Figure 2 is an illustration of the tank when it has been filled with fuel;

Figure 3 is an illustration of the tank when the bag-like evacuating element has been slightly expanded to effect the expulsion of air from the tank, and also showing a device utilized to assist in this operation of removing such air;

Figure 4 shows the tank with the bag-like evacuating element in partially inflated condition and the fuel contents partially expelled;

Figure 5 shows the tank with the bag fully inflated and the tank emptied of its fuel contents;

Figure 6 illustrates the general shape assumed by the bag when the direction of acceleration is in one direction;

Figure 7 illustrates the general shape assumed by the bag when the direction of acceleration is in the opposite direction;

Figure 8 is a vertical fragmentary sectional view showing one end of the tank;

Figure 9 is a fragmentary sectional view illustrating the inlet for the tank;

Figure 10 is a fragmentary sectional view illustrating a venting means for the tank;

Figure 11 is a fragmentary sectional view showing a channel utilized by the tank to conduct fuel to the tank outlet; and Figure 12 is an illustration of a detail.

Having reference now to the drawings, there is illustrated a fuel tank 10 which embodies the features of and is constructed in accordance with the invention. The fuel tank 10, as shown, comprises an elongated shell 11 having generally hemispherical ends 12 and 13 and is formed of corrosion resistant steel, though the particular metal used is not to be considered a part of this invention, as other metals having corrosion resistant properties are contemplated.

A box-like mounting skirt 14 is disposed about the elongated shell 11 and secured thereto as by welding and provides a convenient means for mounting or supporting the fuel tank 10 in a desired location.

The generally hemispherical end 12 of the shell 11 is provided with an annular opening 15 therethrough. Disposed within opening 15 is a mounting ring 16 having a tapped boss portion 17 extending to the exterior of the shell 11 and an outwardly directed peripheral flange 18 which is located within the shell. The flange 18 is of greater width than the annular opening 15 and underlies and abuts against the interior wall of shell 11 in the region of the opening 15. The mounting ring 16 is rigidly secured in position by means of welding as at 21 and a leak-proof attachment is effected.

An annular cover member 22 is provided to close opening 15. The cover member 22 includes an attachment flange portion 23 adapted to carry a circumferentially spaced series of mounting screws 24, which extend through openings in flange 23 each into a respective threaded opening provided by the tapped boss 17. The screws 24 secure the cover 22 to the mounting ring 16.

An opening 25 is provided through the cover 22 and into which is closely fitted one end of a metallic tube 26, the tube 26 being secured in place as by welding. To the opposite end of the tube 26 is secured a conventional attachment fitting 27 by means of which a connection can be made to a source (not shown) of a gaseous medium under pressure.

In the top wall 28 of shell or housing 11, substantially centrally thereof, is provided an annular filler opening 31. Located adjacent the opening 31 and within the shell 11 is a filler unit 32 comprising a downwardly extending internally threaded cylindrical body portion 33 and an outwardly directed peripheral flange 34. The flange 34 is adapted to be welded to the upper wall 28 of the shell 11, as at 35, to secure the filler unit 32 in place. A plug member 36 may be screwed into the body portion 33 to close the filler unit 32. A sealing ring 37 is carried by the plug 36 and lies disposed between the head 38 of the plug and a shouldered portion of the filler unit 32 to effect a leak-proof joint.

Also located in the upper wall 28 of shell 11 and in the vicinity of the filler unit 32 is a vent opening 41. Interiorly of the tank and adjacent the vent opening 41 is mounted, as by welding, a depending vent fitting 42. The vent fitting 42, as best shown in Figure 10, comprises a body portion 43 having a bore 44 therein which communicates with the vent opening 41 and extends substantially the length of the body portion 43 to a bottom wall 45. A plug 46 is adapted to be inserted through vent opening 41 and screwed into an enlarged portion of bore 44 to seal it off. An outwardly extending peripheral attachment flange 47 is provided at the upper end of the body portion 43 and underlies the wall surface surrounding vent opening 41.

Extending through a lateral wall of the vent fitting 42 is an opening 51 which communicates with the bore 44. A conduit 52, generally arcuate in configuration, is connected at one end, as by welding, to the exterior of vent fitting 42 to communicate with opening 51. The opposite end of the arcuate conduit 52 terminates immediately adjacent the upper wall of shell 11. The vent construction just described serves to provide an escape for the air within the fuel tank as the tank is filled with fuel, as will be later more fully described.

As best shown in dotted representation in Figure 1 there is provided interiorly of the shell 11 a continuous generally spiral trackway or channel 53 extending from a point near opening 15 in end 12 of shell 11 to terminate near exit opening provided in the opposite end wall 13. A nipple or attachment fitting 50 is located in this opening to which a conduit (not shown) may be secured to lead the fuel to the point of use.

The trackway or channel 53 is formed of corrosion resistant steel sheet bent into the desired form, substantially U-shaped in cross-section as best shown in Figure 11, although it is understood that other corrosion resistant metals may be utilized. The channel 53 is provided in its opposed side walls 54 and 55 with a multiplicity of spaced openings 56 whereby fuel may enter into the interior of the channel 53 all along its length. The channel or trackway 53 is secured in place upon the interior wall of shell 11 by being welded thereto.

Figure 12 illustrates the end of the trackway 53 located near end 12 of the shell 11. The channel is cut away slightly, as at 57, to space the side walls from the wall of the shell to permit the more ready entrance of fuel into the channel. The end of the trackway or channel 53 located adjacent end 13 of shell 11 is connected to a length of tubing 61, shown in dotted representation in Figure 1, which in turn is connected to the nipple 50. The tubing 61 provides a convenient means for connecting the trackway 53 to an exit opening in the tank.

Contained within shell 11 is an inflatable, elongated bag-like member or envelope 63 which is formed of a flexible material having some elasticity and which is impervious to the effects of the medium in which it is used. Any usual fuel resistant material may comprise the bag 63 such as polyethylene polysulphide, neoprene (polymerized chloroprene) or the rubbery copolymer of butadiene and acrylonitrile, it being understood that the particular composition of the bag does not form a part of this invention.

The bag 63 is inserted into the tank 10 through opening 15 and is securely held in place therein by having the portion 64 thereof surrounding its open end located between the attachment flange 23 of cover 22 and the mounting ring 16 to be tightly clamped therebetween to provide a leak-proof joint upon the installation of the mounting screws 24, which screws pass through openings afforded in portion 64.

The fuel tank 10 of the present invention is filled with fuel, by introducing the fuel through filler unit 32, while the tank occupies a horizontal position. Fuel will continue to be fed to tank 10 until it attains a desired level. In the fueling operation the vent sealing plug 46 is removed and a gauge device 65 screwed into the vent fitting 42. The gauge device 65, as shown in Figure 3, comprises an elongated container having a glass partition 66 provided in the wall thereof, and a manual valve 67 which controls the flow of fuel to gauge 65. When the desired amount of fuel has been forced into the tank 10 the filler unit 32 is closed by its plug 36, a predetermined amount of a gaseous medium under pressure is then introduced into the bag 63 to partially inflate it and cause fuel to pass through the upper open end of the arcuate conduit 52 and therethrough into the vent fitting 42, from which it rises into the gauge device 65. Air in the tank 10 will bubble up from the tank and into gauge device 65. After the air has been forced out by this process the valve 67 is closed, the gauge device removed and the plug 46 returned to seal the vent fitting 42. The preliminary inflation of bag 63 as in Figure 3 is not only for the purpose of expelling air in the tank but to leave a sufficient volume of the tank free of fuel to care for any thermal expansion of the fuel. With the occurrence of thermal expansion the gaseous medium in the bag 63 will be forced outwardly of the bag through inlet tube 26 and back through a check valve (not shown) to the source of pressure. Experience will readily determine the degree of inflation to be given bag 63 to care for a condition of thermal expansion.

The present invention provides an efficient and effective method for driving off air from the fuel tank, which air is desired to be contained in the fuel at as low an amount as possible to avoid the possibility of exploding the combustion chamber (not shown) with which this invention is to be used.

To eject fuel from the fuel tank 10 a gaseous medium under pressure is fed through inlet conduit 26 and into bag 63 to inflate it. As bag 63 expands fuel will be forced through trackway 53 and conduit 61 to issue from nipple 50, to be led to the point of use. Figure 4 illustrates the tank 10 with the bag 63 substantially half inflated. Figure 5 shows the bag 63 fully inflated and all of the fuel ejected from the tank, with the bag assuming the same general shape as the shell 11.

The gaseous medium utilized to inflate bag 63 may be any suitable gas such as nitrogen or carbon dioxide. The type of gas utilized forms no part of the invention.

The construction for a liquid fuel storage tank herein described provides an effective device for discharging fuel from the tank regardless of the position or attitude of the tank or of the direction of acceleration or movement, and further affords a means for ejecting substantially the entire contents of the tank without entrapment of the fuel by the bag to form fuel pockets. In the ejection process the bag 63 on inflating is forced against the exterior of the spiral trackway 53 to drape therearound and close off those openings 56 in that portion of the trackway contacted by the bag. Thus because the openings 56 are closed the trackway in the areas occupied by the bag 63 becomes a closed conduit through which fuel can course. Pressure applied by the inflating bag 63 to the fuel causes the fuel to enter the trackway 53 and flow therethrough to the point of exit at nipple 50. The fuel cannot flow out of the trackway 53 in the areas occupied by the bag 63 because of the ability of the bag to close the openings in the trackway to provide in effect sections of closed conduit. Fuel cannot become entrapped between the bag 63 and the tank wall because an escape means is afforded the fuel through the openings 56 and the fuel can enter the trackway to be carried to the exit.

Figures 6 and 7 illustrate the general positions assumed by the bag 63 dependent on the direction of acceleration of the vehicle carrying the fuel tank 10. In Figure 6 the acceleration is in the direction of end 12 of the tank and the fuel occupies the right-hand portion of the tank and the inflated bag 63 the left-hand portion, and as bag 63 extends toward end 13 it forces the fuel before it out through trackway 53. In Figure 7 the acceleration is in the direction of end 13 and here the positions of the fuel and bag are reversed. As bag 63 continues to expand it moves toward end 12 forcing fuel into trackway 53 and closing those portions of the trackway that it encompasses to provide closed pathways that the fuel can travel to reach the exit nipple 50.

It is obvious that the attitude of the tank 10 has no effect on the ejection of the fuel therefrom because of the cooperation of the bag 63 with the trackway 53. The bag 63 is not required to open up or expand in any given manner or in any given direction. Thus the fuel tank 10 would be particularly desirable for use where fuel ejection at all attitudes is a requirement to be met.

The fuel tank 10 of the present invention is adapted for use with a variety of moving vehicles but is particularly adapted for use with flying devices where weight is at a premium and it is highly desirable to secure a maximum range with a minimum amount of fuel aboard. Substantially the entire contents of the fuel tank 10 will be expelled with the construction described, the only fuel remaining being that contained within the spiral channel 53. The ejection of fuel will be at a constant rate determined by the rate of expansion of the bag 63 to which gas at a suitable and controlled pressure can be fed. The construction further provides for ready replacement of the ejection means (the bag 63) should it become injured. It is here noted that the particular shape assumed by the trackway 53 is not determinative of the invention. A primary aim of this invention is the provision of means which cooperate with the bag to force the bag to effect a channel for the fuel to flow and which is operative irrespective of the attitude of the fuel tank. In place of the U-shaped channel 53 shown and described herein it is readily apparent that a perforated tube formed in a spiral could be utilized. Therefore the present invention contemplates the use of continuous spacers of various suitable shapes for holding the bag away from the tank wall and in the form of a channel, and is not to be limited to the spacer illustrated in the drawings.

While certain preferred embodiments of the invention have been specifically disclosed, it is understood that the invention is not limited thereto as many variations will be readily apparent to those skilled in the art and the invention is to be given its broadest possible interpretation within the terms of the following claims:

1. In a liquid fuel storage tank, an elongated housing, an extended continuous trackway supported adjacent the interior wall of said housing and winding therearound from one end to the other of said housing and having a connection to an exit opening provided in one end of the housing, said extended trackway having a plurality of openings provided therein whereby fuel may pass from the housing into the continuous winding trackway, an impervious inflatable bag enclosed by said housing, and conduit means connected to said housing through which a gaseous medium may be supplied to expand said inflatable bag to force fuel through said trackway to discharge through said exit opening, said bag when inflated contacting said trackway to close openings therein to provide a closed conduit through which the fuel may flow.

2. In a liquid fuel storage tank, an elongated housing, an extended continuous trackway supported, in the form of a spiral, adjacent the interior wall of said housing, and winding around said interior wall from one end of the elongated housing to the other and having a connection to an exit opening provided in one end of the housing, said extended trackway having a plurality of openings provided along the length thereof whereby fuel may pass from the housing into the trackway, an impervious inflatable elongated bag enclosed by said housing and when fully inflated assuming the same general shape as the housing to be surrounded by said spiral continuous trackway, and conduit means connected to said housing at the end opposite to the end having said exit opening through which conduit means a gaseous medium may be supplied to expand said inflatable bag to force fuel through said trackway to discharge through said exit opening, said bag when inflated contacting said trackway to close openings therein to provide a closed conduit through which the fuel may flow.

3. A liquid fuel storage tank comprising an elongated shell, a continuous channel supported, in the form of a spiral, by the interior wall of the shell, winding around said interior wall from one end of the elongated shell to the other and having a connection to an exit opening provided in one end of the shell, said channel having a plurality of openings provided along its length whereby fuel may pass from the shell into the channel, said shell having an enlarged opening in the end thereof opposite the end having said exit opening with a removable cover for said enlarged opening, an impervious, inflatable, elongated bag having a shape when inflated which conforms to the internal shape of the shell and is surrounded by said continuous spiral channel, said elongated bag being secured to the shell adjacent said enlarged opening, and conduit means connected to said shell through which a gaseous medium may be supplied to the bag to expand said inflatable bag to force fuel through said channel to discharge through said exit opening, said bag when inflated enveloping said channel to seal openings embraced by the bag to provide a closed conduit through which the fuel may flow.

4. A liquid fuel storage tank comprising an elongated shell, a continuous channel supported, in the form of a spiral, by the interior wall of the shell, winding around said interior wall from one end of the elongated shell to the other and having a connection to an exit opening provided in one end of the shell, said channel having a plurality of openings provided along its length whereby fuel may pass from the shell into the channel, a filler unit provided in the upper wall of said shell whereby fuel may be introduced into the shell, a sealable vent means also located in the upper wall of said shell to provide an outlet for the escape of air that may be present in the shell and which is operative at the time the shell is filled with fuel, said shell having an enlarged opening in the end thereof opposite the end having said exit opening with a removable cover for said enlarged opening, an impervious, inflatable, elongated bag having a shape when inflated which conforms to the internal shape of the shell and is surrounded by said continuous spiral channel, said elongated bag being secured to the shell adjacent said enlarged opening, and conduit means connected to said shell through which a gaseous medium may be supplied to the bag to expand said inflatable bag to force fuel through said channel to discharge through said exit opening, said bag when inflated enveloping said channel to seal openings embraced by the bag to provide a closed conduit through which the fuel may flow.

5. A liquid fuel storage tank comprising a housing, a continuous spiral channel generally U-shaped in cross-section and supported by the interior wall of the housing, winding therearound from one end to the other of said housing, said wall closing the open side of the channel, a connection between the channel and an exit opening provided in one end of the housing, said channel having a plurality of spaced openings provided in each of the opposed vertical sides of the channel whereby fuel may pass from the housing into the channel, an impervious, inflatable bag contained within said housing adapted, when inflated, to assume a shape conforming to the internal shape of the housing to be surrounded by said continuous spiral channel, and conduit means connected to said housing at the end thereof opposite to the housing end having said exit opening through which a gaseous medium may be supplied to the inflatable bag to expand said bag to force fuel through said channel to discharge through said exit opening, said bag when inflated enveloping said channel to seal openings embraced by the bag to provide a closed conduit through which the fuel may flow.

6. A liquid fuel storage tank comprising a housing, a continuous spiral channel affixed to the interior wall of said housing and winding around said interior wall from one end of the housing to the other, said channel being generally U-shaped in cross-section with the open side thereof being closed by said interior wall, a connection between the channel and an exit opening provided in one end of the housing, said channel having a plurality of spaced perforations provided in each of the opposed vertical sides of the channel along the lengths thereof whereby fuel may pass from the housing into the channel, said housing having an enlarged opening in the end thereof opposite the end having said exit opening, a removable cover for closing said enlarged opening, an impervious, inflatable bag disposed within said housing and having its open end disposed adjacent said enlarged opening in the housing, said removable cover acting to clamp this end of the bag to the housing, said bag when inflated adapted to assume a shape conforming to the internal shape of the housing to be surrounded by said continuous spiral channel, and conduit means connected to the removable cover through which a gaseous medium may be supplied to the inflatable bag to expand said bag to force fuel through said channel to discharge through said exit opening, said bag when inflated enveloping said channel to seal openings embraced by the bag to provide a closed conduit through which the fuel may flow.

7. A liquid fuel storage tank comprising an elongated housing, a continuous spiral channel affixed to the interior wall of said housing and winding around said interior wall from one end of the housing to the other, said channel being generally U-shaped in cross-section with the open side thereof being closed by said interior wall, a connection between the channel and an exit opening provided in one end of the housing, said channel having a plurality of spaced perforations provided in each of the opposed vertical sides of the channel along the lengths thereof whereby fuel may pass from the housing into the channel, a filler unit in the upper wall of said housing through which fuel is introduced into the housing, normally sealed vent means also located in said upper wall whereby air may escape from the housing during the filling thereof at which time the vent means are open, said housing having an enlarged opening in the end thereof opposite the end having said exit opening, a removable cover for closing said enlarged opening, an impervious, inflatable, elongated bag disposed within said housing and having its open end disposed adjacent said enlarged opening in the housing, said removable cover acting to clamp this end of the bag to the housing, said bag when inflated adapted to assume a shape conforming to the internal shape of the housing to be surrounded by said continuous spiral channel, and conduit means connected to the removable cover through which a gaseous medium may be supplied to the inflatable bag to expand said bag to force fuel through said channel to discharge through said exit opening, said bag when inflated enveloping said channel to seal openings embraced by the bag to provide a closed conduit through which the fuel may flow.

JOHN B. KIMBALL.

REFERENCES CITED

The following references are of record in the file of this patent:

UNITED STATES PATENTS

| Number | Name | Date |
|---|---|---|
| 2,063,430 | Graser | Dec. 8, 1936 |
| 2,097,985 | Maryott | Nov. 2, 1937 |
| 2,105,160 | Piquerez | Jan. 11, 1938 |